United States Patent [19]

Kruse

[11] Patent Number: 4,509,042
[45] Date of Patent: Apr. 2, 1985

[54] PORTAL RADIATION MONITOR

[75] Inventor: Lyle W. Kruse, Albuquerque, N. Mex.

[73] Assignee: The United States of America as represented by the United States Department of Energy, Washington, D.C.

[21] Appl. No.: 361,152

[22] Filed: Mar. 23, 1982

[51] Int. Cl.³ ............................................. G08B 21/00
[52] U.S. Cl. ................................. 340/600; 250/361 R; 250/395
[58] Field of Search ............ 340/600; 250/395, 336.1, 250/367, 361; 346/3.3 B, 152; 34/527

[56] References Cited

U.S. PATENT DOCUMENTS 3,221,166 11/1965 Allenden ........................... 250/336.1
3,518,429 6/1970 Laguerre ............................ 250/336.1
3,978,337 8/1976 Nickles et al. ...................... 250/367

OTHER PUBLICATIONS

Martinez, J. L. et al., Safeguards Personnel Monitor, RFP-1839, Dow Chemical U.S.A., Golden, Colorado, Jan. 26, 1972.
Forest, R. D., Chemistry Research & Development, RFP 2102-A Dow Chemical U.S.A., Golden, Colorado, Aug. 13, 1973.
Forest, R. D., Chemistry Research & Development, RFP 2200-A Dow Chemical U.S.A., Golden, Colorado.
Forest, R. D., Chemical Research & Development, RFP 2276-A Dow Chemical U.S.A., Golden, Colorado, Aug. 30, 1974.

Primary Examiner—Glen R. Swann, III
Attorney, Agent, or Firm—George H. Libman; Albert Sopp; Judson R. Hightower

[57] ABSTRACT

A portal radiation monitor combines 0.1% FAR with high sensitivity to special nuclear material. The monitor utilizes pulse shape discrimination, dynamic compression of the photomultiplier output and scintillators sized to maintain efficiency over the entire portal area.

8 Claims, 7 Drawing Figures

PORTAL RADIATION MONITOR

The United States Government has rights in this inventions pursuant to Contract No. DE-AC04-76DP00789 between the Department of Energy and Sandia Corporation

BACKGROUND OF THE INVENTION

The present invention relates generally to a portal radiation monitor and more particularly to a portal radiation monitor utilizing pulse shape discrimination to improve sensitivity and reduce false alarms.

It is important for the welfare and continued existence of mankind for controls to be maintained over the transportation and possession of special nuclear materials (SNM) such as $^{235}U$ and $^{239}Pu$. Portal radiation monitors are often used to survey personnel leaving an institution containing special nuclear materials to ensure that these materials are not being secreted outside the facility.

A portal radiation monitor consists of three components: a detector, a signal processor and an alarm module. The detector is usually a scintillator which takes the form of an inorganic crystal such as NaI(T1), an organic liquid such as NE-235 or an organic solid such as BC-400 plastic. In order to maintain a reasonable detector cost it is also desirable to cover as much area as possible with a minimum of photomultiplier-scintillator units. For example, one commercially available portal monitor utilizes two vertical solid slab BC-400 (formerly NE-102) plastic scintillators, each scintillator being approximately six feet long and mounted on one side of a portal.

In most existing systems, the output of the photomultiplier tube is processed according to the amplitude of each pulse. The alarm module employed in these systems cannot verify that the processed signals are from radiation-induced events. As a result, such systems have high and unpredictable false-alarm rates and are generally not too sensitive.

SUMMARY OF THE INVENTION

It is an object of this invention to provide a portal radiation monitor having a false alarm rate of 0.1% to $3.1\sigma$ alarm threshold.

It is another object of this invention to provide a portal radiation monitor utilizing a pulse shape discriminator.

It is a further object of this invention to provide a portal radiation monitor utilizing a plastic slab scintillator no longer than approximately 80 centimeters.

It is also an object of this invention to provide a portal radiation monitor which comprises high sensitivity with a low false alarm rate.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the personnel radiation monitor of this invention may comprise a scintillator for detecting radiation at a portal, a photomultiplier tube for converting scintillations into electrical pulses, a pulse shape discriminator for passing only pulses from the photomultiplier having a predetermine rise time indicative of a radiation event, and an alarm module for counting each pulse from the discriminator and indicating an output when the count rate exceeds a predetermined level.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTIONS

Figure 1:
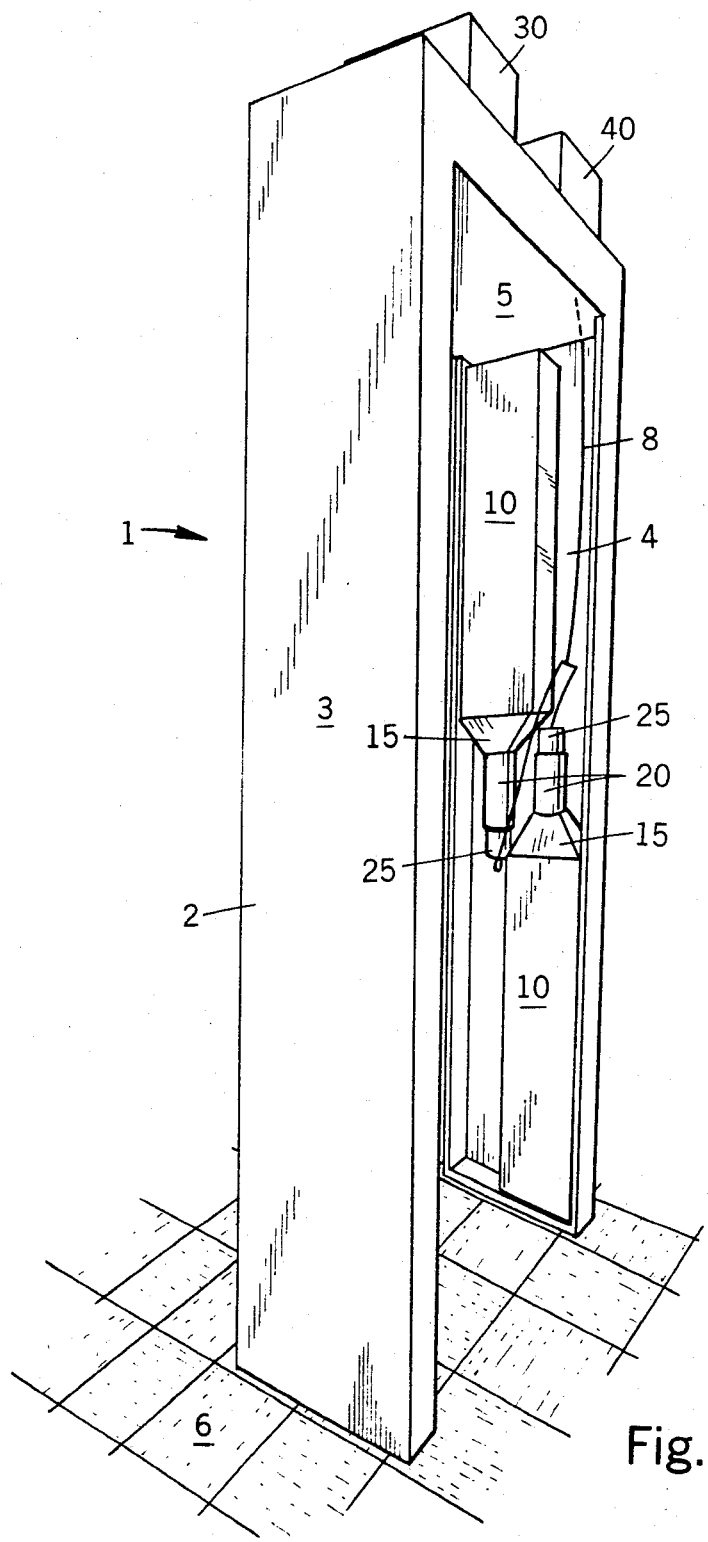
FIG. 1 is a portal radiation monitor in accordance with this invention.

FIG. 1 shows a portal radiation monitor 1 in accordance with a preferred embodiment of this invention including structure defining portal 2 having opposed sides 3 and 4 and connecting top 5. Floor 6 forms the bottom of portal 2 and serves as a surface upon which personnel may walk through the portal. Imbedded within each of opposed sides 3 and 4 are plastic scintillators 10 as described hereinafter. Connected to each scintillator is a light pipe 15, a photomultiplier tube 20 and base 25. Also included in the invention is processing circuit 30 and alarm circuit 40 which are serially connected by wires 8 to the parallel output connections of each photomultiplier tube. In use, portal 2 would be mounted at an opening in a gate or wall through which personnel would pass for radiation monitoring. The structure may include additional turns and doors to prevent special nuclear material (SNM) from being thrown through the opening and to ensure that each person remains in the monitor long enough for the radiation check to occur. Alarm circuit 40 could be mounted at a sentry station where personnel carrying through the portal could be observed.

The overall efficiency of a portal monitor is a function of both intrinsic detector efficiency and the geometric arrangement of the detector within the portal. Instrinsic detector efficiency is dependent upon how 100 KeV to 2 MeV gamma emission from special nuclear material react in each detector. In general, a detector of high density has high efficiency because of the greater likelihood of collision between gamma radiation and the detector. Scintillation results from the ionized and/or excited atomics states left by gamma ray interaction. Among common scintillator materials, it has been shown that NaI(T1) has approximately twice the likelihood of a gamma interaction than either BC-400 plastic or NE-235 liquid scintillators. However, the attenuation of visible emission within a scintillator is also an important characteristic for a personnel radiation monitory.

The approximate attenuation length (1/e) for BC-400 plastic is 2.5 meters, for NE-235 liquid 4.5 meters and for NaI(T1) between 0.25 and 0.75 meter. Since it is imperative to minimize the number of discrete detectors in order to lower the cost of the device, it has been found that a few radiation detectors of either plastic or liquid are more cost effective than a plurality of other types of radiation detectors including NaI(T1).

In the present invention, scintillator 10 comprises a slab of BC-400 plastic having the approximate dimensions of 5 centimeters thick by 20 centimeters wide by 80 centimeters long. It is has been discovered that emissions which have to travel in BC-400 more than 80 centimeters to the photomultiplier tube are severely attenuated, thereby reducing the sensitivity of the monitor to radiation passing more than 80 cm from the tube. Without this improvement, it would be possible to move SNM through the detector adjacent the end of the slab distant from the photomultiplier tube without detection.

Photomultiplier tube 20 is connected to scintillator 10 by light pipe 15 constructed of clear acrylic plastic having one end sized to match with the end of scintillator slab 10 and a reduced other end sized to match the light receiving end of photomultiplier tube 20. The efficiency of the system is further stabilized against changes with age by bonding the photomultiplier to the light pipe with Dow Corning 3140 RTV, a bonding material which serves the dual function of providing a good optical match and preventing detector surface crazing which has been observed to occur with silicone grease bonding methods previously used. The funnel shaped light pipe provides a large increase in light collection efficiency from the scintillator to the photomultiplier tube.

A photomultiplier tube is linear over a very wide range of light amplitudes. Also, the amplitude of output scintillations from radiation to be detected by the portal monitor may vary over a wide range of amplitudes. However, the electronic processing circuitry connected to the photomultiplier tube does not have a wide dynamic range. Accordingly, dynamic compression of output signals from the photomultiplier is desirable to increase the range of effectiveness of this monitor. Although dynamic compression could be obtained by use of a non-linear amplifier, it has been found that it may be also obtained much less expensively through the use of a few simple resistors.

Figure 2A:
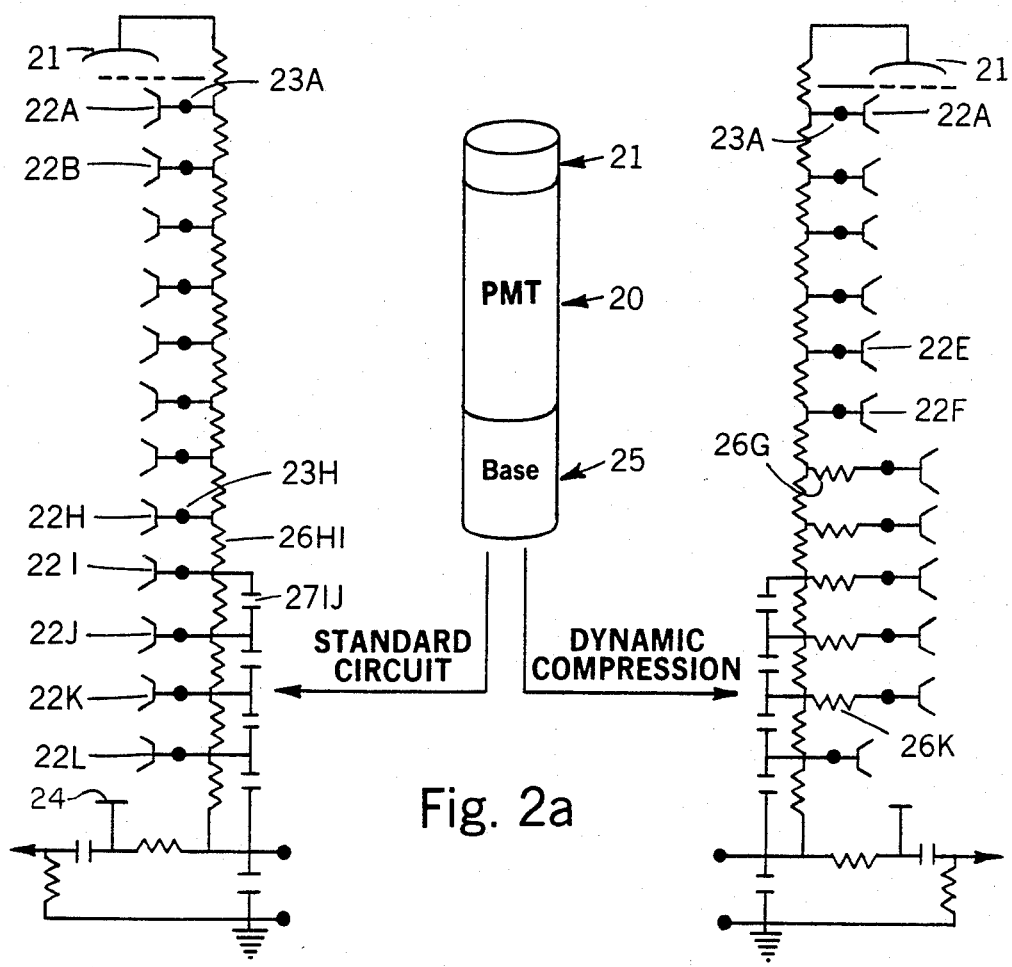
FIG. 2A is a circuit diagram showing the standard and improved connections of the photomultiplier tube used in this invention.

FIG. 2a shows a schematic representation of alternate circuitry for connecting photomultiplier tube 20 either with or without dynamic compression. (It is understood that only one of the alternate circuits is used with any photomultiplier tube). Photomultipler tube 20 has a photosensitive cathode 21 and a plurality of dynodes 22A through 22L. Light sensed by cathode 21 causes the release of electrons which are attracted to dynode 22A. Each dynode is arranged within the tube such that electrons released from one dynode will flow to a properly biased adjacent dynode. Biasing is provided through an external resistor network mounted in base 25 and connected to the dynodes through pins 23A through 23L. In the standard circuit shown to the left of FIG. 2A, the biasing circuit comprises a resistor network having a resistor 26 connected between each adjacent dynode; for example, resistor 26BC connects pins 23B and 23C. The end of the network at cathode 21 is biased negatively with respect to the opposing end at anode 24. In operation, light striking cathode 21 releases electrons which are attracted to adjacent dynode 22A where they strike and release more electrons which, in chain reaction fashion, procede down the string of dynodes to dynode 22L and anode 24. At the output end, the burst of electrons is great enough to constitute a disturbance that can be amplified by external electronic circuitry. Parallel capacitors are provided across resistors at the output end of the network to increase the current available for dynodes 22I through 22L.

Figures 2B, 2C:
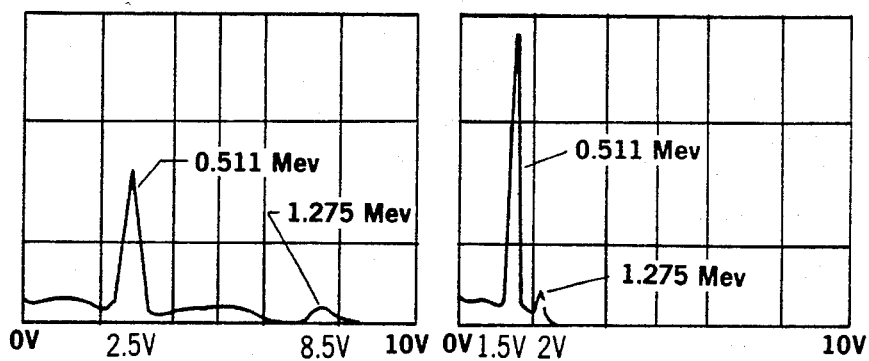
FIGS. 2B and 2C are representations of the outputs of a photomultiplier tube using the standard and improved circuits of FIG. 2A.

The output of this circuit is shown in FIG. 2B. A 0.5 MeV gamma emission causes approximately a 2.5 volt pulse from photomultiplier tube 20 while a 1.3 MeV gamma emission causes an 8.5 volt output. Since the downstream signal processing circuitry has a maximum input of 10 volts, it is apparent that further amplification of these signals is not possible without distorting the larger signal.

The improved circuitry utilizing dynamic compression is shown on the right side of FIG. 2A. From cathode 21 to dynode 22F the resistive network is the same as in the standard circuit. However, dynodes 22G through 22K have additional resistors 26G through 26K between pins 23 and the resistive network. When photomultiplier tube 21 senses large gamma emissions, the electronic pulse at dynodes 22G through 22K is quite large. Resistors 26G through 26K serve to limit the current to these dynodes, thereby reducing the size of these pulses. The output of this circuit is shown in FIG. 2C, where pulses caused by both 0.5 MeV and 1.3 MeV gamma emissions are seen to be 1.5 and 2 volts, respectively. Thus the output pulses caused by a wide range of gamma emissions will occur within a narrow range of voltage, permitting substantially identical processing of each radiation-event signal by electronic circuitry downstream.

Prior portal monitors have used pulse height analysis to determine which outputs of the photomultiplier tube are representative of gamma emissions. The sensitivity of these devices has suffered because many noise pulses have pulse amplitudes which are indistinguishable from low-level radiation event pulses. However, it has been found that pulse shape discrimination provides a substantial improvement in signal-to-noise performance. The circuit of FIG. 3, although known in other applications as a means for discriminating between rise times of neutron and gamma radiation, is suited for use as a signal processor to give greatly improved performance in a portal monitor. In pulse shape discriminator 30, a fast preamp 31 takes the signal from the photomultiplier tube and generates direct and inverted output signals. The direct signal passes through amplifier 32 and a variable delay 34 set to compensate for delays in the other branch of the circuit. The inverted signal passes through an integrating delay line amplifier (IDLY) 33 which integrates the signal and then cancels its own output with a larger inverted and delayed mirror image of the integrated signal. This amplifier thus provides an output which crosses zero volts at unique points in time dependant upon rise time but not pulse amplitude. A timing signal channel analyzer 35 then produces a fast negative output pulse at the zero crossing time of the output of amplifier 33. This signal and the output of delay 34 are fed into time-to-amplitude convertor 36 which furnishes an analog pulse having an amplitude proportional to the rise time of the input pulse. Suitable amplitude comparison means may be then used to pass only those pulses having rise times indicative of gamma emissions.

Figure 3:
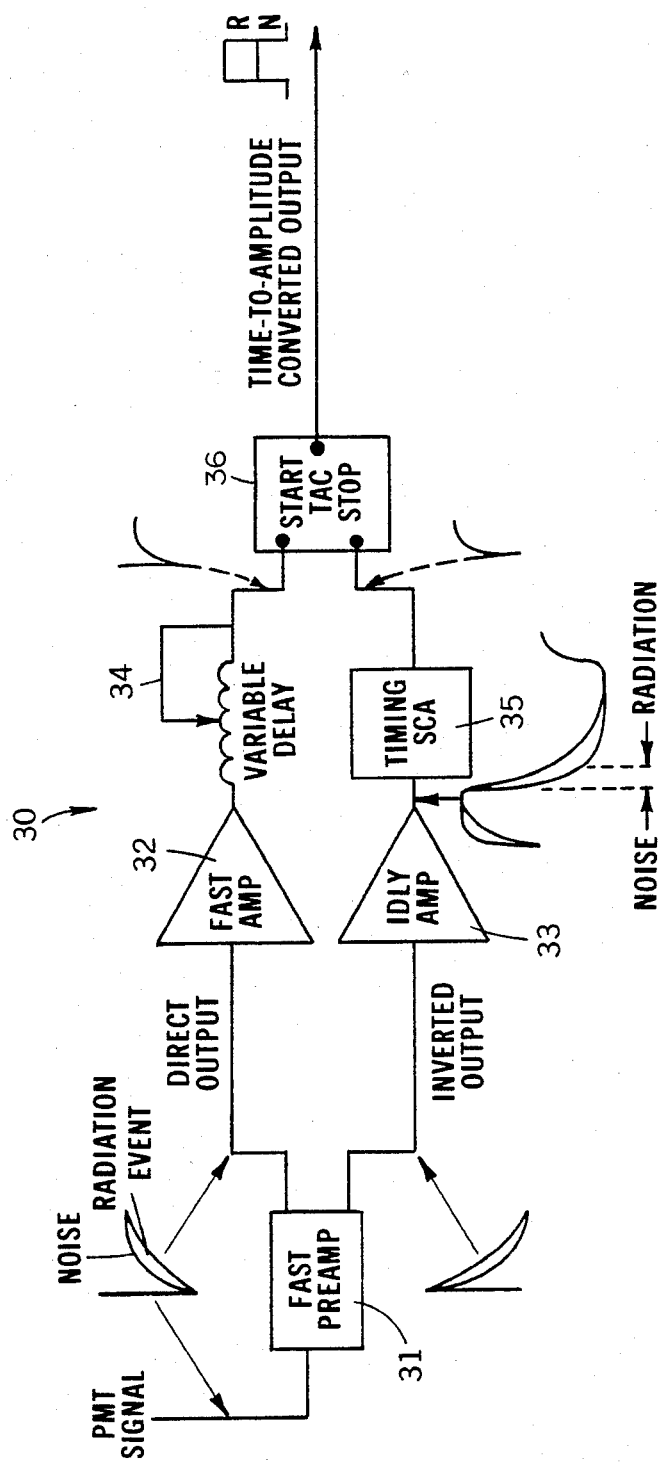
FIG. 3 is a block diagram of a zero-crossing pulse shape discrimination circuit.

Although the zero-crossing method of discrimination is shown in FIG. 3, other equivalent methods of rise-time discrimination, such as constant-fraction timing, may also be utilized without departing from the invention. An Ortec 458 Pulse Shape Analyzer, a constant-fraction device, has been used in a preferred embodiment of the invention.

The increased sensitivity of a radiation monitor utilizing pulse shape discrimination is based on the fact that radiation interaction within a given detector results in an output pulse having a unique rise time regardless of pulse amplitude. Since the majority of noise pulses have different rise times than pulses from radiation interaction, pulse shape discrimination eliminates these noise pulses from consideration by the alarm circuit. In addition, the non-linear pulse amplitudes resulting from dynamic compression of the PMT output cause no loss in sensitivity to amplitude independent measurements based on rise time. Accordingly, use of the pulse shape discriminator in a portal monitor results in a tremendous increase in detection efficiency over the previously employed amplitude analysis approach.

The final step in the detection chain is the resolution of the process signal in alarm module 40. Existing systems have high and unpredictable false alarm rates (FAR) because, as described above, their processors are unable to distinguish low radiation pulses from noise pulses. Radioactive emissions have a unique nature of being described by Poisson statistics which have the property that for numbers of observations greater than 30, the distribution cannot be distinguished from a normal distribution of the same mean having a standard deviation equal to the square root of that mean. In other words, the variance and the mean are equal for Poisson distributed radioactive emissions.

It is therefore possible to determine if a radiation monitor is measuring only radiation by comparing the mean and the variance of a series of observations of the monitor. Since known commercial monitors using pulse height analysis must include a number of noise pulses with radiation pulses, especially at background levels, these monitors are found to not follow Poisson distribution too accurately. Consequently, these monitors are also found to have a FAR which is unstable and from 200 to 700 times too high. To compensate for this FAR, these monitors must operate with high alarm thresholds that prevent the detection of low amounts of radiation.

Figure 4:
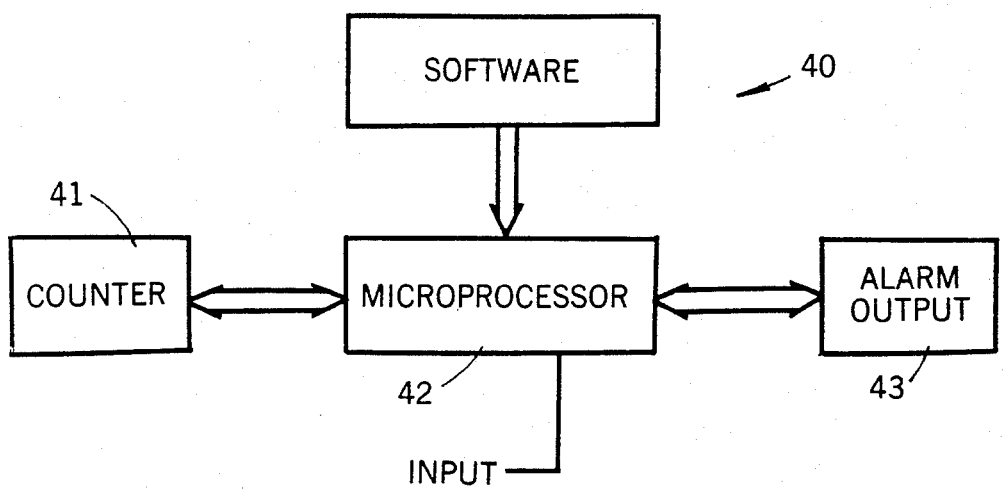
FIG. 4 is a block diagram of the alarm module utilized in this invention.

FIG. 4 shows a block diagram of alarm module 40 including counter 41, microprocessor 42 and output 43. The microprocessor permits the counter to count the processed signals and reads the count at appropriate times as defined below to control various outputs.

The novel feature of the alarm module is as follows. When the unit is first initialized, a series of 64 two second counts of background radiation are taken to establish that radiation is being measured. The microprocessor compares the mean of the series of counts with the variance, and signals "fault" if the variance is greater than 125% or less than 75% of the mean. If they are within this range, the variance is set as the background level and alarm levels are set at 3.1 $\sigma$ and 4 $\sigma$, respectively. The first alarm level provides a 0.1% FAR while the second alarm level provides a 0.003% FAR. The use of two alarm levels provides a redundant check for the operator in the event that the alarm is triggered. After the alarm level has been set, the processor continuously updates the background level not less than every 20 seconds by dropping the measurement from one of the background counts and taking another background count and recomputing the threshhold, and adjusting the background and alarm levels accordingly. Of course, this background update is interrupted whenever the portal is used and a check for the presence of radiation is to be made. In addition, the program provides that every four hours after a period of heavy use of the portal monitor (which might indicate a shift change at a factory), the entire 64 sample background count is dumped and another 64 samples are taken, thereby recomputing the background level and performing another variance/mean test.

The program provides for two second counting periods merely to enable comparison with existing commercial devices which also use two second periods. Since the background radiation at a typical installation yields approximately 3,000 to 5,000 counts per two second period, the program provides that the count period may be reduced to as little as one-tenth second. Although the sensitivity of the device is proportional to the square root of the duration of the period, a shorter period could be advantageous in that it computes the background level more quickly than a longer count period and that it permits more people to be checked by the monitor in a given period of time. Of course, count-time also can be increased to increase sensitivity.

Figure 5:
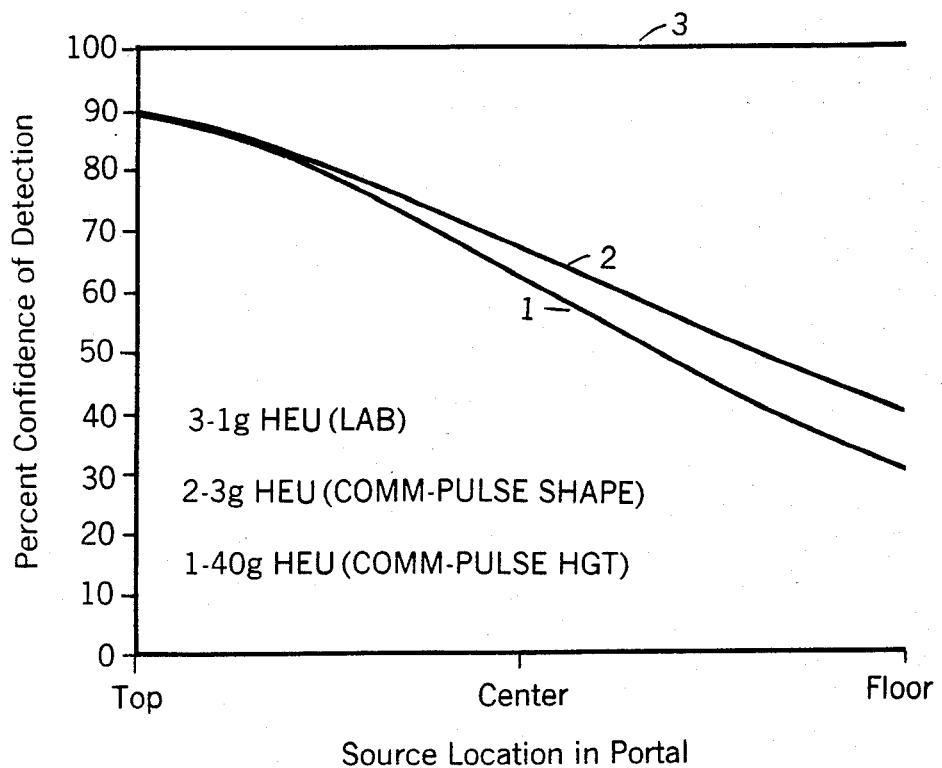
FIG. 5 is a graph showing the performance of the invention.

Comparison experiments have been run on a commercially available portal monitor having pulse height analysis and on a laboratory monitor built in accordance with the invention. FIG. 5 shows the percent of the time an indicated sample would be detected if transported through the indicated location in the portal. (The commercial monitor utilized a single 210 cm slab of NE102 plastic on each side, with a photocell mounted at the top of each slab.) Curve 1 shows the performance of the commercial device detecting 40 grams of 93% $^{235}$U; the monitor having a 90% detection rate at the top of the portal and a 30% detection rate at the floor. This monitor, which can be subverted by carrying SNM at floor level, was unable to detect 3 grams of $^{235}$U. The same monitor with the substitution of a pulse shape discriminator is shown in curve 2 to provide better detection of 3 grams of $^{235}$U than it did with 40 grams using pulse height discrimination. Curve 3 shows the 99% detection rate of a laboratory monitor having two 80 cm plastic slabs on each side (to provide uniform detection from floor to top), pulse shape discrimination and the improved alarm module.

The addition of dynamic compression to the detector of curve 3 does not yield measurable improvement for unshielded test sources. However, for a sample of 75 grams of $^{238}$U (i.e., not enriched) shielded by 1.25 cm of lead, the commercial monitor provides no detection, the detector of curve 3 provides no 50% detection rate, and the detector of curve 3 with dynamic compression provides a 90% detection rate.

The particular components and equipment discussed above are cited merely to illustrate a particular embodiment of the invention. It is comtemplated that the use of this invention may involve different components as long as the principle, using pulse shape discrimination (and/or dynamic compression-and/or alarm logic based upon statistical testing) for portal radiation monitoring, is followed. A monitor so constructed will provide a sensitive, reliable indication of the presence of special nuclear materials in a doorway. It is intended that the scope of the invention be defined by the claims appended hereto.

I claim:

1. A portal radiation monitor comprising:
    a portal having spaced opposed sides defining an opening therebetween;
    scintillator means connected to said sides for detecting radiation within said opening;
    means for converting scintillations from said scintillator means into electrical pulses;
    pulse-shape discriminator means for producing only output pulses corresponding to pulses from said converting means having a predetermined rise time indicative of a radiation event;
    alarm means for indicating the presence of radiation at the monitor when the count rate of pulses from said discrimination exceeds a predetermined level.

2. The portal radiation monitor of claim 1 wherein said scintillator means comprises a slab of BC-411 plastic about 5 cm thick by 21 cm wide by 80 cm long; and said means for converting scintillations comprises a photomultiplier tube mounted to view a first end of said slab.

3. The portal radiation monitor of claim 2 further comprising a clear acrylic light pipe having a cross-section at one end matching the cross-section of the first end of said slab, the other end of said pipe being conformed to receive said photo-multiplier tube, said light pipe being fastened between said slab and said photomultiplier tube.

4. The portal radiation monitor of claim 3 wherein said scintillator means comprises two of said plastic slabs on each side of said portal, and said means for converting scintillations comprises two adjacent photomultiplier tubes on each side of said portal, each of said slabs being operably connected to a one of said tubes through a light pipe.

5. A portal radiation monitor comprising:
    scintillator means for detecting radiation at a portal;
    means for converting scintillations from said scintillator means into electrical pulses, said converting means comprising a photomultiplier tube having a linear output over several orders of magnitude, and further comprising means for compressing the output of said tube by providing greater amplification of low amplitude pulses than high amplitude pulses;
    pulse-shape discriminator means for producing only output pulses corresponding to pulses from said converting means having a predetermined rise time indicative of a radiation event; and
    alarm means for indicating the presence of radiation at the monitor when the count of rate of pulses from said discriminator exceeds a predetermined level.

6. The portal radiation monitor of claim 5 wherein said photomultiplier tube includes a plurality of dynodes, each dynode having an electrical connection point; and said means for compressing comprises a resistance voltage divider network having a number of nodes equal to the number of electrical connection points, a majority of the nodes each being directly connected to one connection point, the remainder of the nodes each being connected to one connection point through a resistor.

7. A portal radiation monitor comprising:
    scintillator means for detecting radiation at a portal;
    means for converting scintillations from said scintillator means into electrical pulses;
    pulse-shape discriminator means for producing only output pulses corresponding to pulses from said converting means having a predetermined rise time indicative of a radiation event; and
    alarm means for indicating the presence of radiation at the monitor when the count rate of pulses from said discrimination exceeds a predetermined level, said alarm means comprising computer means for determining the count rate, said computer including warm-up means for controlling said computer to measure a background signal count rate for a predetermined period of time prior to passage of radiation through the portal and comparator means for providing an output during operation of the monitor when the count exceeds three times the square root of the background signal level.

8. The portal radiation monitor of claim 7 wherein said computer includes means for periodically updating the background signal level.

* * * * *